(12) United States Patent
Yamazaki et al.

(10) Patent No.: US 12,709,195 B2
(45) Date of Patent: Aug. 18, 2026

(54) INFORMATION PROCESSING DEVICE AND VEHICLE

(71) Applicant: HONDA MOTOR CO., LTD., Tokyo (JP)

(72) Inventors: Keiko Yamazaki, Saitama (JP); Shintaro Tanaka, Saitama (JP); Kazuyuki Takahashi, Saitama (JP); Ryo Kobayashi, Saitama (JP); Masakuni Yamamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 640 days.

(21) Appl. No.: 18/129,478

(22) Filed: Mar. 31, 2023

(65) Prior Publication Data

US 2023/0311712 A1 Oct. 5, 2023

(30) Foreign Application Priority Data

Mar. 31, 2022 (JP) ................................ 2022-060190

(51) Int. Cl.
*B60L 58/30* (2019.01)
*H01M 8/04537* (2016.01)

(52) U.S. Cl.
CPC ......... *B60L 58/30* (2019.02); *H01M 8/04574* (2013.01); *H01M 2250/20* (2013.01)

(58) Field of Classification Search
CPC .......... H01M 8/04574; H01M 2250/20; B60L 58/30

(Continued)

(56) References Cited

U.S. PATENT DOCUMENTS

2013/0065150 A1 3/2013 Matsusue
2015/0125772 A1 5/2015 Matsusue et al.
(Continued)

FOREIGN PATENT DOCUMENTS

CN 104282925 A 1/2015
CN 113675438 A 11/2021
(Continued)

OTHER PUBLICATIONS

Ma et al. Data-driven prognostics for PEM fuel cell degradation by long short-term memory network, IEEE ITEC, 2018, pp. 102-107. Retrieved from https://ieeexplore.ieee.org/document/8449962 (Year: 2018).*

(Continued)

*Primary Examiner* — James M Erwin
(74) *Attorney, Agent, or Firm* — Paratus Law Group, PLLC

(57) ABSTRACT

An information processing device includes an acquisition unit which acquires use history information indicating a use history of a vehicle, a prediction unit which predicts an output decrease amount based on use history information acquired by the acquisition unit and output decrease characteristic information indicating an output decrease characteristic of a fuel cell in the vehicle according to the use history, and a control unit which executes predetermined processing based on the output decrease amount predicted by the prediction unit. The control unit executes processing of predicting a deterioration time at which a rated output of the fuel cell is equal to or smaller than a threshold value based on changes in the output decrease amount from start of use of the vehicle to present, and outputting information indicating the deterioration time.

7 Claims, 9 Drawing Sheets

(58) Field of Classification Search
USPC .......................................................... 429/428
See application file for complete search history.

(56) References Cited

U.S. PATENT DOCUMENTS

| | | | |
|---|---|---|---|
| 2018/0215283 A1* | 8/2018 | Matsusue ................ | B60L 58/40 |
| 2021/0359318 A1 | 11/2021 | Nakanishi et al. | |
| 2022/0200026 A1* | 6/2022 | Kishida ................. | G06F 1/1635 |

FOREIGN PATENT DOCUMENTS

| | | |
|---|---|---|
| JP | H01-122570 A | 5/1989 |
| JP | H11-097049 A | 4/1999 |
| JP | 2004-342510 A | 12/2004 |
| JP | 2006-024437 A | 1/2006 |
| JP | 2007-059129 A | 3/2007 |
| JP | 2007-128769 A | 5/2007 |
| JP | 2010-238476 A | 10/2010 |
| JP | 2011-060674 A | 3/2011 |
| JP | 2011-243477 A | 12/2011 |
| JP | 2013-218557 A | 10/2013 |
| JP | 2015-095305 A | 5/2015 |
| JP | 2017-142944 A | 8/2017 |
| WO | WO 2013/128610 A1 | 9/2013 |
| WO | WO 2018/109858 A1 | 6/2018 |

OTHER PUBLICATIONS

Jan. 30, 2024, Translation of Japanese Office Action issued for related JP Application No. 2022-060190.

Jun. 25, 2024, Translation of Japanese Office Action issued for related JP Application No. 2022-060190.

Oct. 1, 2024, Translation of Japanese Office Action issued for related JP Application No. 2022-060190.

May 25, 2026, translation of Chinese Office Action issued for related CN Application No. 202310333188.0.

* cited by examiner 100
10
12
14
16
18
BP INJECTOR
54
INJECTOR
48
50
52
ANODE PUMP
58
44
46
46a
56
40
42
60
60a
FUEL CELL STACK
22
30
26
28
24 (24a)
32
36
21
20
24 (24b)
34
CONTROL DEVICE
200
OUTPUT DEVICE
300
BATTERY
Bt
TRAVEL MOTOR
Mt
REFRIGERANT PUMP
90
84
86
RADIATOR
88
92a (92)
92b (92)
HUMIDI-FIER
74
75
75a
62
64
EGR PUMP
82
68
72
76
78
66
80
COM-PRESSOR
70

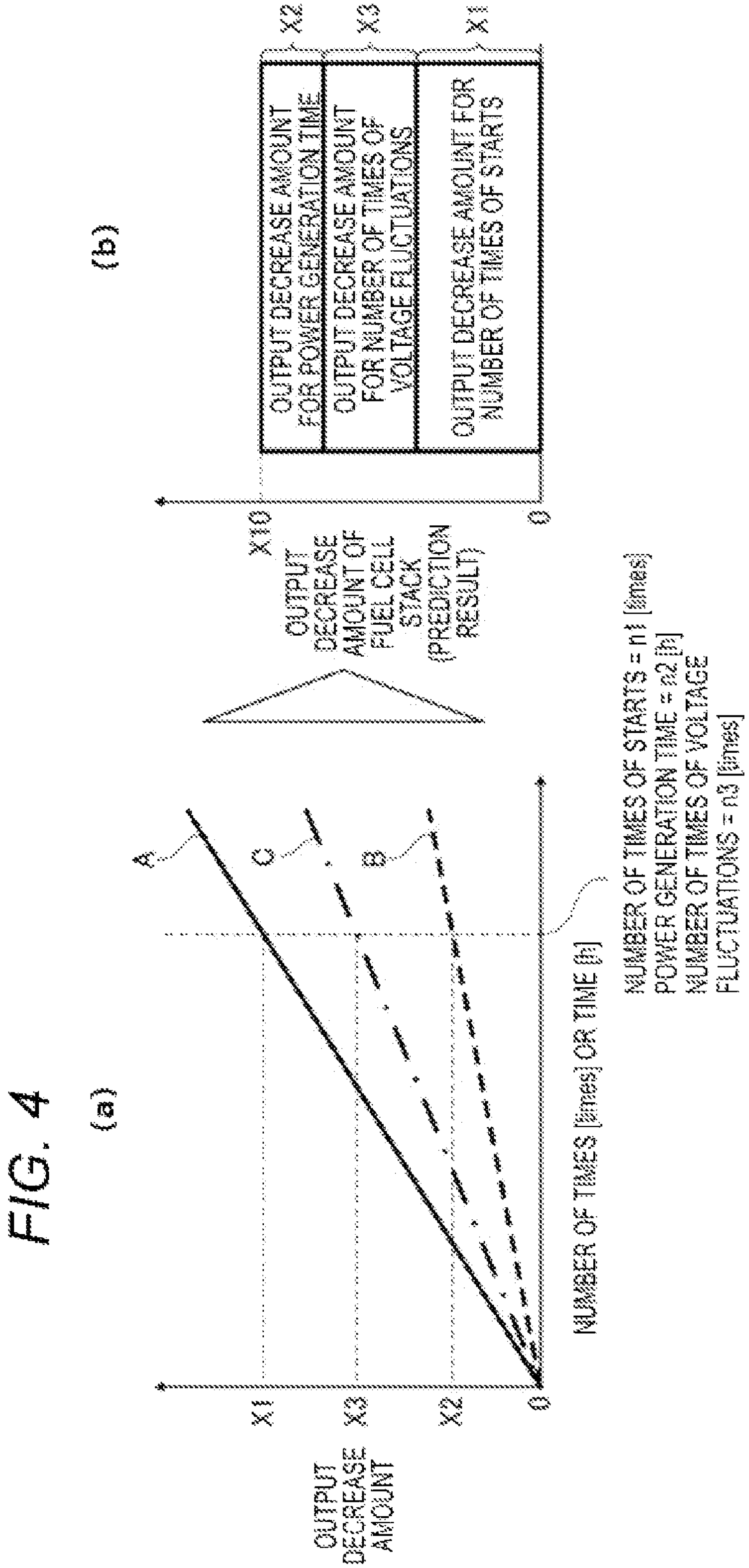
FIG. 4
(a)
(b)
OUTPUT DECREASE AMOUNT
X1
X3
X2
0
A
C
B
NUMBER OF TIMES [times] OR TIME [h]
NUMBER OF TIMES OF STARTS = n1 [times]
POWER GENERATION TIME = n2 [h]
NUMBER OF TIMES OF VOLTAGE FLUCTUATIONS = n3 [times]
OUTPUT DECREASE AMOUNT OF FUEL CELL STACK (PREDICTION RESULT)
X10
OUTPUT DECREASE AMOUNT FOR POWER GENERATION TIME
OUTPUT DECREASE AMOUNT FOR NUMBER OF TIMES OF VOLTAGE FLUCTUATIONS
OUTPUT DECREASE AMOUNT FOR NUMBER OF TIMES OF STARTS

| ITEM | OUTPUT DECREASE FACTOR |
|---|---|
| NUMBER OF TIMES OF STARTS | FACTOR α |
| POWER GENERATION TIME | FACTOR β |
| NUMBER OF TIMES OF VOLTAGE FLUCTUATIONS | FACTOR γ |
| TRAVEL TIME | FACTOR α |
| STOP TIME | FACTOR β |

INFORMATION PROCESSING DEVICE AND VEHICLE

CROSS-REFERENCE TO RELATED APPLICATION

The present application claims priority from Japanese Patent Application No. 2022-060190 filed on Mar. 31, 2022, the entire content of which is incorporated herein by reference.

TECHNICAL FIELD

The present invention relates to an information processing device and a vehicle.

BACKGROUND ART

In recent years, researches and development on a fuel cell that contributes to efficiency of energy have been carried out to ensure access to affordable, reliable, sustainable, and modern energy for more people. In recent years, as one of efforts for implementing a low-carbon society or a decarbonization society, a fuel cell electric vehicle including a fuel cell as a power source and a drive source driven by electric power of the fuel cell has been developed (for example, see JP201-243477A and WO2013/128610).

The fuel cell deteriorates as the fuel cell is used, and a rated output gradually decreases. Therefore, in a fuel cell system including a fuel cell as a power source of a fuel cell electric vehicle or the like, it is desirable to take an appropriate measure such as replacement of the fuel cell when the fuel cell is deteriorated.

SUMMARY

The present invention provides an information processing device and a vehicle which are capable of supporting taking an appropriate measure in consideration of deterioration of a fuel cell.

According to a first aspect of the present invention, there is provided an information processing device for predicting an output decrease amount of a fuel cell in a vehicle including the fuel cell and a drive source driven by electric power of the fuel cell. The information processing device includes an acquisition unit configured to acquire use history information indicating a use history of the vehicle, a prediction unit configured to predict the output decrease amount based on use history information acquired by the acquisition unit and output decrease characteristic information indicating an output decrease characteristic of the fuel cell according to the use history, and a control unit configured to execute predetermined processing based on the output decrease amount predicted by the prediction unit. The control unit executes processing of predicting a deterioration time at which a rated output of the fuel cell is equal to or smaller than a threshold value based on changes in the output decrease amount from start of use of the vehicle to present, and outputting information indicating the deterioration time.

According to a second aspect of the present invention, there is provided an information processing device for predicting an output decrease amount of a fuel cell in a vehicle including the fuel cell and a drive source driven by electric power of the fuel cell. The information processing device includes an acquisition unit configured to acquire use history information indicating a use history of the vehicle for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined control based on the output decrease amount for each of the output decrease factors estimated by the factor-specific output decrease amount estimation unit. The control unit executes processing of predicting a deterioration time at which an output decrease amount for any one of the output decrease factors is equal to or larger than a threshold value based on changes in the output decrease amount for each of the output decrease factors from start of use of the vehicle to present, and outputting information indicating the deterioration time.

According to a third aspect of the present invention, there is provided an information processing device for predicting an output decrease amount of a fuel cell in a fuel cell system including the fuel cell. The information processing device includes an acquisition unit configured to acquire use history information indicating a use history of the fuel cell system, a prediction unit configured to predict the output decrease amount based on use history information acquired by the acquisition unit and output decrease characteristic information indicating an output decrease characteristic of the fuel cell according to the use history, and a control unit configured to execute predetermined processing based on the output decrease amount predicted by the prediction unit. The control unit executes processing of predicting a deterioration time at which a rated output of the fuel cell is equal to or smaller than a threshold value based on changes in the output decrease amount from start of use of the fuel cell system to present, and outputting information indicating the deterioration time.

According to a fourth aspect of the present invention, there is provided an information processing device for predicting an output decrease amount of a fuel cell in a fuel cell system including the fuel cell. The information processing device includes an acquisition unit configured to acquire use history information indicating a use history of the fuel cell system for a plurality of items related to an output decrease of the fuel cell, a derivation unit configured to derive the output decrease amount for each of the items based on use history information acquired by the acquisition unit and output decrease characteristic information indicating an output decrease characteristic of the fuel cell for each of the items, a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items, and a control unit configured to execute predetermined processing based on the output decrease amount for each of the output decrease factors estimated by the factor-specific output decrease amount estimation unit. The control unit executes processing of predicting a deterioration time at which an output decrease amount for any one of the output decrease factors is equal to or larger than a threshold value based on changes in the output decrease amount for each of the output decrease factors from start of use of the fuel cell system to present, and outputting information indicating the deterioration time.

According to the present invention, it is possible to provide the information processing device and the vehicle capable of supporting taking an appropriate measure in consideration of deterioration of the fuel cell.

BRIEF DESCRIPTION OF DRAWINGS

FIG. 4 is a diagram showing an example of output decrease characteristic information and a prediction example of an output decrease amount using the output decrease characteristic information according to the first embodiment.

DESCRIPTION OF EMBODIMENTS

Hereinafter, each embodiment of an information processing device and a vehicle including the information processing device according to the present invention will be described. In the following description, the same or similar elements are denoted by the same or similar reference signs, and the description thereof may be omitted or simplified as appropriate.

First Embodiment

First, a first embodiment of the present invention will be described with reference to FIGS. 1 to 6.

<Vehicle>

Figure 1:
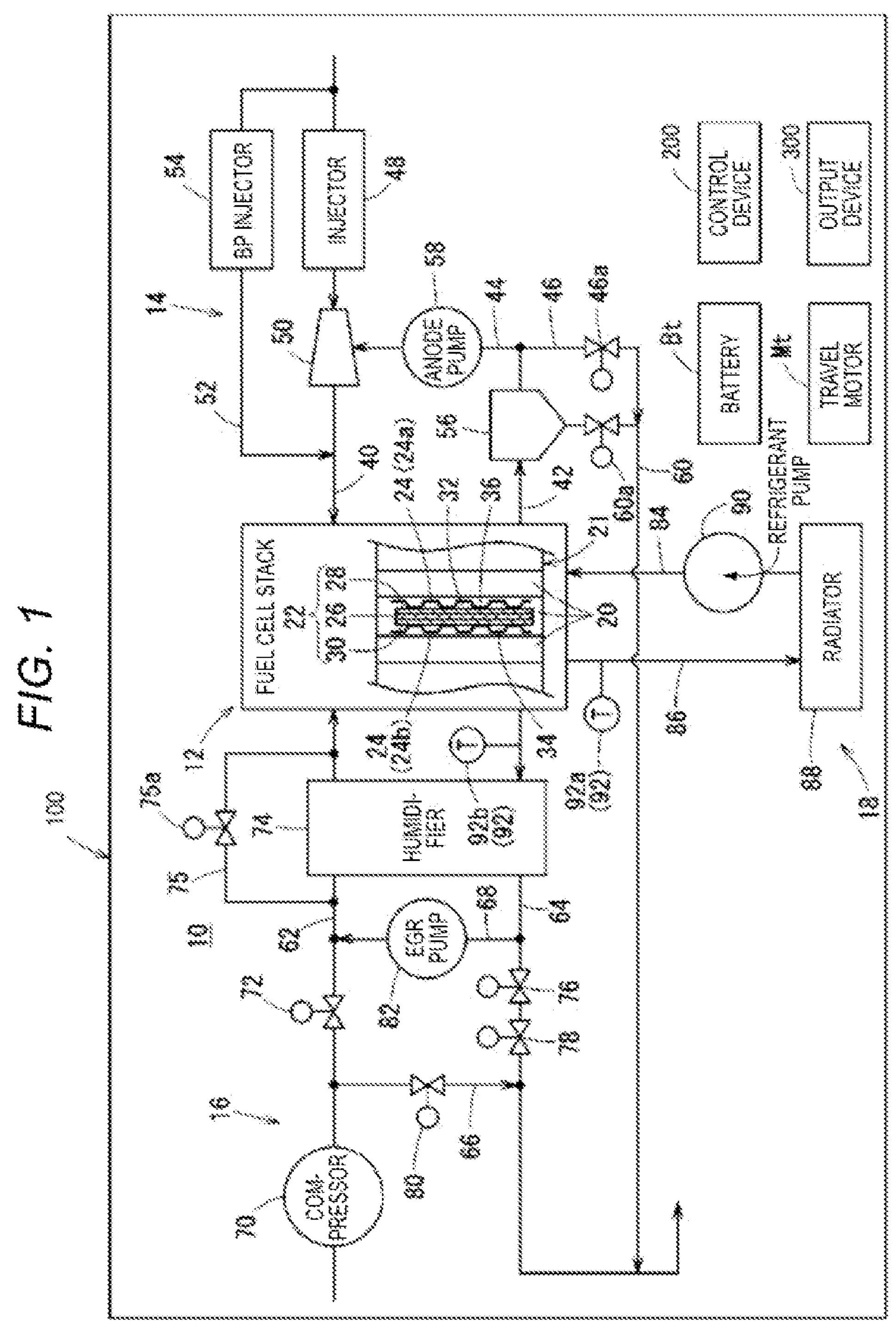
FIG. 1 is a diagram showing an overall configuration of a vehicle 100 according to a first embodiment.

As shown in FIG. 1, a vehicle 100 according to the present embodiment includes a fuel cell system 10. The fuel cell system 10 includes a fuel cell stack 12, an anode system device 14, a cathode system device 16, and a cooling device 18. The fuel cell system 10 is mounted in a motor room, for example, of the fuel cell vehicle 100 (fuel cell electric vehicle, hereinafter simply referred to as "vehicle 100"), and supplies electric power generated by the fuel cell stack 12 to a battery Bt, a travel motor Mt, and the like to drive the vehicle 100.

The fuel cell stack 12 includes a plurality of power generation cells 20 for generating power by an electrochemical reaction between anode gas (fuel gas such as hydrogen) and cathode gas (oxidant gas such as air). The plurality of power generation cells 20 are implemented as a stacked body 21 stacked along a vehicle width direction with electrode surfaces in a standing posture in a state in which the fuel cell stack 12 is mounted on the vehicle 100. The plurality of power generation cells 20 may be stacked in a vehicle length direction (front-rear direction) or in a gravity direction of the vehicle 100.

Each of the power generation cells 20 includes an electrolyte membrane/electrode structure 22 (hereinafter referred to as "MEA 22") and a pair of separators 24 (separator 24*a* and separator 24*b*) sandwiching the MEA 22. The MEA 22 includes an electrolyte membrane 26 (for example, a solid polymer electrolyte membrane (cation exchange membrane)), an anode electrode 28 provided at one surface of the electrolyte membrane 26, and a cathode electrode 30 provided at the other surface of the electrolyte membrane 26. Although the detailed description and illustration are omitted, each of the anode electrode 28 and the cathode electrode 30 is implemented by providing a catalyst layer and a gas diffusion layer in this order from an electrolyte membrane 26 side. The catalyst layer (hereinafter, also simply referred to as "catalyst") of each of the anode electrode 28 and the cathode electrode 30 includes, for example, platinum particles for increasing a reaction rate of the electrochemical reaction between the anode gas and the cathode gas, and carbon as a carrier for supporting the platinum particles.

The separator 24*a* forms an anode gas flow path 32 through which anode gas flows at one surface of the MEA 22. The separator 24*b* forms a cathode gas flow path 34 through which cathode gas flows at the other surface of the MEA 22. A refrigerant flow path 36 through which a refrigerant flows is formed at surfaces w % here the separator 24*a* and the separator 24*b* face each other by stacking the plurality of power generation cells 20.

Further, the fuel cell stack 12 includes a plurality of communication holes (anode gas communication holes, cathode gas communication holes, and refrigerant communication holes) (not shown) through which each of the anode gas, the cathode gas, and the refrigerant flows along a stacking direction of the stacked body 21. The anode gas communication holes communicate with the anode gas flow path 32, the cathode gas communication holes communicate with the cathode gas flow path 34, and the refrigerant communication holes communicate with the refrigerant flow path 36.

The anode gas is supplied to the fuel cell stack 12 by the anode system device 14. In the fuel cell stack 12, the anode gas flows through an anode gas communication hole (anode gas inlet communication hole) to flow into the anode gas flow path 32, and is used for power generation in the anode electrode 28. Anode off-gas (including unreacted hydrogen) used for the power generation flows out from the anode gas flow path 32 to an anode gas communication hole (anode gas outlet communication hole), and is discharged from the fuel cell stack 12 to the anode system device 14.

The cathode gas is supplied to the fuel cell stack 12 by the cathode system device 16. In the fuel cell stack 12, the cathode gas flows through a cathode gas communication hole into the cathode gas flow path 34, and is used for power generation in the cathode electrode 30. Cathode off-gas used for the power generation flows out from the cathode gas flow path 34 to a cathode gas communication hole, and is discharged from the fuel cell stack 12 to the cathode system device 16.

Further, the refrigerant is supplied to the fuel cell stack 12 by the cooling device 18. In the fuel cell stack 12, the refrigerant flows through a refrigerant communication hole into the refrigerant flow path 36, and cools the power generation cell 20. The refrigerant which has cooled the power generation cell 20 flows out from the refrigerant flow path 36 to a refrigerant communication hole, and is discharged from the fuel cell stack 12 to the cooling device 18.

The stacked body 21 of the fuel cell stack 12 is housed in, for example, a stack case (not shown). A terminal plate, an insulating plate, and an end plate (not shown) are arranged in this order outward at both ends of the stacked body 21 in the stacking direction. The end plate applies a tightening load along the stacking direction of the power generation cells 20.

The anode system device 14 of the fuel cell system 10 includes an anode supply path 40 for supplying anode gas to the fuel cell stack 12, and an anode discharge path 42 for discharging anode off-gas from the fuel cell stack 12. An anode circulation path 44 is coupled between the anode supply path 40 and the anode discharge path 42 for returning unreacted hydrogen in the anode off-gas of the anode discharge path 42 to the anode supply path 40. Further, the anode circulation path 44 is coupled to a purge path 46 for discharging the anode off-gas from a circulation circuit of the anode system device 14.

An injector 48 and an ejector 50 are provided in series in the anode supply path 40, and a supply bypass path 52 is coupled across the injector 48 and the ejector 50. A bypass (BP) injector 54 is provided in the supply bypass path 52. The injector 48 is a main injector mainly used during power generation, and the BP injector 54 is a sub injector used to supply a high concentration of hydrogen when the fuel cell stack 12 is started or when a high load of power generation is required.

The ejector 50 supplies anode gas to the fuel cell stack 12 downstream while sucking the anode off-gas from the anode circulation path 44 by a negative pressure generated by movement of the anode gas ejected from the injector 48.

The anode discharge path 42 is provided with a gas-liquid separator 56 for separating water (generated water during power generation) in the anode off-gas from the anode off-gas. The anode circulation path 44 is coupled to an upper portion of the gas-liquid separator 56, and anode off-gas (gas) flows to the anode circulation path 44.

The anode circulation path 44 is provided with an anode pump 58 for circulating the anode off-gas to the anode supply path 40. Further, one end of a drain path 60 for discharging the separated water is coupled to a bottom of the gas-liquid separator 56. The drain path 60 is provided with a drain valve 60*a* for opening and closing a flow path. The purge path 46 is coupled to the drain path 60, and a purge valve 46*a* for opening and closing a flow path is provided on the way.

The cathode system device 16 of the fuel cell system 10 includes a cathode supply path 62 for supplying cathode gas to the fuel cell stack 12, and a cathode discharge path 64 for discharging cathode off-gas from the fuel cell stack 12. Between the cathode supply path 62 and the cathode discharge path 64, a cathode bypass path 66 for allowing the cathode gas in the cathode supply path 62 to directly flow to the cathode discharge path 64 and a cathode circulation path 68 for circulating the cathode off-gas in the cathode discharge path 64 to the cathode supply path 62 are coupled.

The cathode supply path 62 is provided with a compressor 70 which compresses air from the atmosphere and supplies the air. The cathode supply path 62 includes a supply-side on-off valve 72 downstream of the compressor 70 and downstream of the cathode bypass path 66, and a humidifier 74 between the compressor 70 (specifically, downstream of the supply-side on-off valve 72) and the fuel cell stack 12. Although not shown, the cathode supply path 62 is provided with an auxiliary device such as an intercooler for cooling the cathode gas. Further, in the vicinity of the humidifier 74 in the cathode supply path 62, a humidifier bypass path 75 for bypassing the humidifier 74 is provided, and a humidifier bypass valve 75*a* for opening and closing the humidifier bypass path 75 is provided.

The humidifier 74 is provided in the cathode discharge path 64. The humidifier 74 humidifies the cathode gas in the cathode supply path 62 with moisture in the cathode off-gas in the cathode discharge path 64. The cathode discharge path 64 includes a discharge-side on-off valve 76 and a back pressure valve 78 downstream of the humidifier 74 and the cathode circulation path 68. Further, the drain path 60 of the anode system device 14 is coupled to the cathode discharge path 64.

The cathode bypass path 66 is provided with a flow rate regulating valve 80 for regulating a flow rate of the cathode gas bypassing the fuel cell stack 12. The cathode circulation path 68 is provided with an EGR pump 82 for circulating the cathode off-gas in the cathode discharge path 64 to the cathode supply path 62.

The cooling device 18 of the fuel cell system 10 has a refrigerant supply path 84 for supplying a refrigerant to the fuel cell stack 12, and a refrigerant discharge path 86 for discharging a refrigerant from the fuel cell stack 12. The refrigerant supply path 84 and the refrigerant discharge path 86 are coupled to a radiator 88 which cools the refrigerant. The refrigerant supply path 84 is provided with a refrigerant pump 90 for circulating a refrigerant in a refrigerant circulation circuit (between the fuel cell stack 12, the refrigerant supply path 84, the refrigerant discharge path 86, and the radiator 88).

The fuel cell system 10 includes a plurality of temperature sensors 92 for detecting a temperature of the fuel cell stack 12. Examples of the temperature sensors 92 include a refrigerant outlet temperature sensor 92*a* provided upstream (fuel cell stack 12 side) of the refrigerant discharge path 86, and a cathode outlet temperature sensor 92*b* provided upstream (fuel cell stack 12 side) of the cathode discharge path 64.

The fuel cell system 10 described above includes a control device (information processing device) 200 which controls an operation of each component of the fuel cell system 10, and an output device 300 configured to output information indicating a deterioration time of the fuel cell stack 12 and the like according to control of the control device 200.

The control device 200 is implemented by, for example, an electronic control unit (ECU) including a processor which performs various calculations, a storage device having a non-transitory storage medium which stores various types of information, and an input and output device which controls input and output of data between an inside and an outside of the control device 200. The control device 200 may be implemented by one ECU or may be implemented by a plurality of ECUs.

The output device 300 includes, for example, a notification device capable of notifying a user of the vehicle 100 of various types of information. An example of the notification device is a display device such as a liquid crystal display capable of displaying various images. The notification device is not limited to the display device, and may be a speaker or the like capable of outputting various sounds. The output device 300 may include a communication device capable of communicating with a computer outside the vehicle 100 via a predetermined network such as a mobile communication network.

<Control Device>

Figure 2:
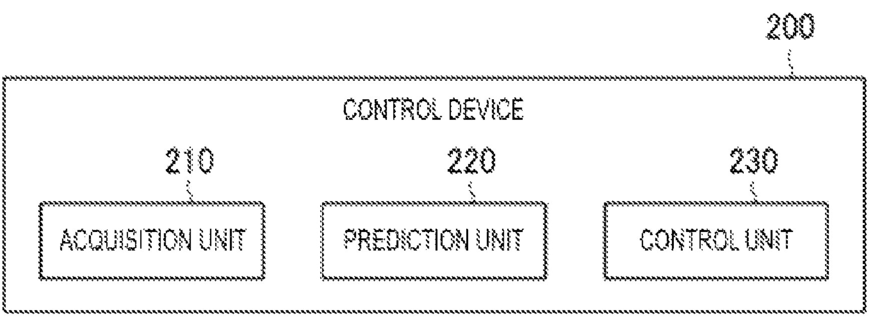
FIG. 2 is a block diagram showing an example of a functional configuration of a control device 200 in the vehicle 100 according to the first embodiment.

As shown in FIG. 2, the control device 200 as the information processing device according to the first embodiment includes, for example, an acquisition unit 210, a prediction unit 220, and a control unit 230 as functional units which are implemented by a processor executing a program stored in the storage device of the control device 200.

The acquisition unit 210 acquires use history information indicating a use history of the vehicle 100. Here, the use history information is information indicating the use history of the vehicle 100 for an item related to deterioration (in other words, output decrease) of the fuel cell stack 12. For example, the use history information includes information indicating the number of times of starts of the vehicle 100 (in other words, the number of times of starts of the fuel cell stack 12), a power generation time of the fuel cell stack 12, and the number of times of fluctuations in an output voltage of the fuel cell stack 12 (hereinafter, also simply referred to as "the number of times of voltage fluctuations") as the item related to the deterioration of the fuel cell stack 12.

The use history information may include information indicating a start time of the vehicle 100 (in other words, a start time of the fuel cell stack 12), instead of or in addition to the information indicating the number of times of starts. The use history information may include information indicating the number of times of power generation of the fuel cell stack 12, instead of or in addition to the information indicating the power generation time. Further, the use history information may include information indicating the number of times of fluctuations in an output current of the fuel cell stack 12 (hereinafter, also simply referred to as "the number of times of current fluctuations"), instead of or in addition to the information indicating the number of times of voltage fluctuations. Generally, counting the number of times of current fluctuations can be implemented more easily in terms of control than counting the number of times of voltage fluctuations.

The use history information may include information indicating the power generation time and/or the number of times of power generation for each output current of the fuel cell stack 12. As a specific example, the use history information may include information in which the power generation time of the fuel cell stack 12 up to now is classified into power generation time for each output current, such as accumulation of the power generation time by an output current of Ia [A] being Na [h], and accumulation of the power generation time by an output current of Ib [A] being Nb [h]. The use history information may include information in which the number of times of power generation of the fuel cell stack 12 up to now is classified into the number of times of power generation for each output current, such as accumulation of the number of times of power generation by the output current of Ia [A] being Nx [times], and accumulation of the number of times of power generation by the output current of Ib [A] being Ny [times]. If the information indicating the power generation time and/or the number of times of power generation for each output current of the fuel cell stack 12 is in the use history information, it is possible to acquire a highly accurate output decrease amount even when an output decrease speed of the fuel cell stack 12 varies depending on a current value of the output current. Instead of or in addition to the information indicating the power generation time and/or the number of times of power generation for each output current, information indicating the power generation time and/or the number of times of power generation for each output voltage of the fuel cell stack 12 may be in the use history information. That is, the use history information may include information in which the power generation time or the number of times of power generation of the fuel cell stack 12 up to now is classified for each output voltage.

Further, the use history information may include information indicating a travel time and/or the number of times of traveling of the vehicle 100, and information indicating a stop time and/or the number of times of stopping of the vehicle 100.

Figure 3:
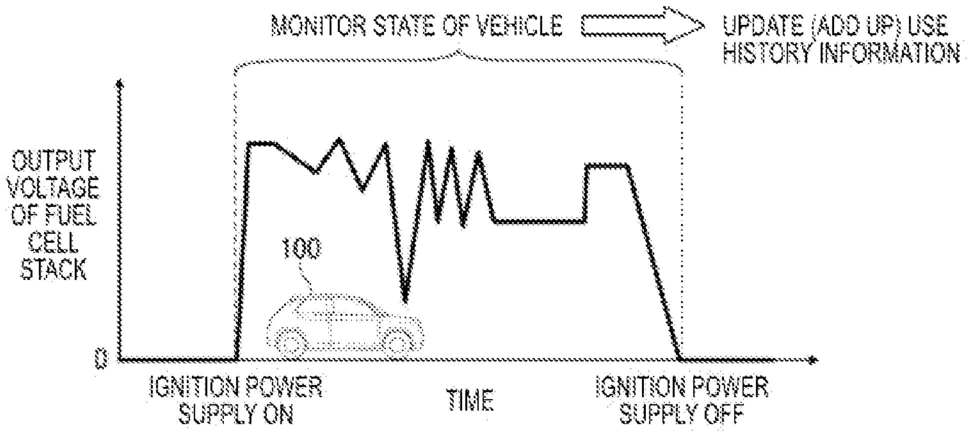
FIG. 3 is a diagram showing an example of update of use history information according to the first embodiment.

For example, as shown in FIG. 3, the control device 200 monitors a state of the vehicle 100 including the output voltage of the fuel cell stack 12 while the vehicle 100 is started (while an ignition power supply is on). By this monitoring, the control device 200 successively adds up, for example, the number of times of starts of the vehicle 100, the power generation time of the fuel cell stack 12, and the number of times of voltage fluctuations in the fuel cell stack 12 from initial start of the vehicle 100, and stores the use history information indicating the number of times of starts of the vehicle 100, the power generation time of the fuel cell stack 12, and the number of times of voltage fluctuations in the fuel cell stack 12 from the initial start of the vehicle 100 up to now in the storage device of the control device 200.

The acquisition unit 210 acquires the use history information stored in the storage device of the control device 200 in this manner at a predetermined timing. A timing at which the acquisition unit 210 acquires the use history information may be, for example, at the time of starting the vehicle 100. In this way, it is possible to predict an output decrease amount of the fuel cell stack 12 each time the vehicle 100 is started. The timing at which the acquisition unit 210 acquires the use history information is not limited to when the vehicle 100 is started, and the acquisition unit 210 may, for example, acquire the use history information when a predetermined operation is received from a user. In this way, the user can predict the output decrease amount of the fuel cell stack 12 at a desired timing.

The prediction unit 220 predicts the output decrease amount of the fuel cell stack 12 based on the use history information acquired by the acquisition unit 210 and output decrease characteristic information indicating an output decrease characteristic of the fuel cell stack 12. Here, the output decrease characteristic information is stored in advance in the storage device of the control device 200, for example. The output decrease characteristic information may be stored in a storage device external to the control device 200 configured for reference by the control device 200.

For example, as shown in (a) of FIG. 4, the output decrease characteristic information may be information indicating each output decrease characteristic, that is, an output decrease characteristic A, an output decrease characteristic B, and an output decrease characteristic C. Here, the output decrease characteristic A is an output decrease characteristic indicating an output decrease amount of the fuel cell stack 12 according to the number of times of starts of the vehicle 100. The output decrease characteristic A indicates that the output decrease amount of the fuel cell stack 12 also increases as the number of times of starts of the vehicle 100 increases, and for example, indicates that the output decrease amount of the fuel cell stack 12 is X1 when the number of times of starts of the vehicle 100 is n1 times (n1>0).

Here, the output decrease characteristic B is an output decrease characteristic indicating an output decrease amount of the fuel cell stack 12 according to the power generation time of the fuel cell stack 12. The output decrease characteristic B indicates that the output decrease amount of the fuel cell stack 12 also increases as the power generation time of the fuel cell stack 12 increases, and for example, indicates that the output decrease amount of the fuel cell stack 12 is X2 when the power generation time of the fuel cell stack 12 is n2 [h] (n2>0).

Here, the output decrease characteristic C is an output decrease characteristic indicating an output decrease amount of the fuel cell stack 12 according to the number of times of voltage fluctuations. The output decrease characteristic C indicates that the output decrease amount of the fuel cell stack 12 also increases as the number of times of voltage fluctuations increases, and for example, indicates that the output decrease amount of the fuel cell stack 12 is X3 when the number of times of voltage fluctuations is n3 (n3>0).

By referring to such output decrease characteristic information, the prediction unit 220 acquires the output decrease amount of the fuel cell stack 12 for each of the number of times of starts of the vehicle 100, the power generation time of the fuel cell stack 12, and the number of times of voltage fluctuations in the fuel cell stack 12 indicated by the use history information acquired by the acquisition unit 210. The prediction unit 220 derives a value obtained by adding up acquired output decrease amounts as a prediction result.

For example, as shown in (b) of FIG. 4, it is assumed that the output decrease amount for the number of times of starts of the vehicle 100 is X1, the output decrease amount for the power generation time of the fuel cell stack 12 is X2, and the output decrease amount for the number of times of voltage fluctuations is X3. In this case, the prediction unit 220 derives X10=X1+X2+X3 as the prediction result of the output decrease amount of the fuel cell stack 12.

For example, when the use history information includes information indicating the start time of the vehicle 100, output decrease characteristic information including information indicating the output decrease amount of the fuel cell stack 12 according to the start time of the vehicle 100 is prepared in advance. Similarly, when the use history information includes information indicating the number of times of power generation of the fuel cell stack 12, the travel time and/or the number of times of traveling of the vehicle 100, or the stop time and/or the number of times of stopping of the vehicle 100, output decrease characteristic information including information indicating the output decrease amount of the fuel cell stack 12 according to the number of times of power generation of the fuel cell stack 12, the travel time and/or the number of times of traveling of the vehicle 100, or the stop time and/or the number of times of stopping of the vehicle 100 is prepared in advance.

The control unit 230 executes predetermined control based on the output decrease amount predicted by the prediction unit 220.

For example, every time the vehicle 100 is started, the control device 200 acquires use history information by the acquisition unit 210, and derives, by the prediction unit 220, an output decrease amount and a rated output of the fuel cell stack 12 based on the use history information. Here, as the rated output of the fuel cell stack 12, for example, a value obtained by subtracting the output decrease amount from an initial rated output of the fuel cell stack 12 is calculated. The control device 200 stores the derived output decrease amount and rated output of the fuel cell stack 12 and a time at which the output decrease amount and rated output are derived (for example, a time specified by an elapsed time from start of use of the vehicle 100) in association with each other in the storage device or the like of the control device 200. Accordingly, the control unit 230 can grasp changes in the output decrease amount and the rated output from the start of use of the vehicle 100 to the present by referring to information stored in the storage device.

Figure 5:
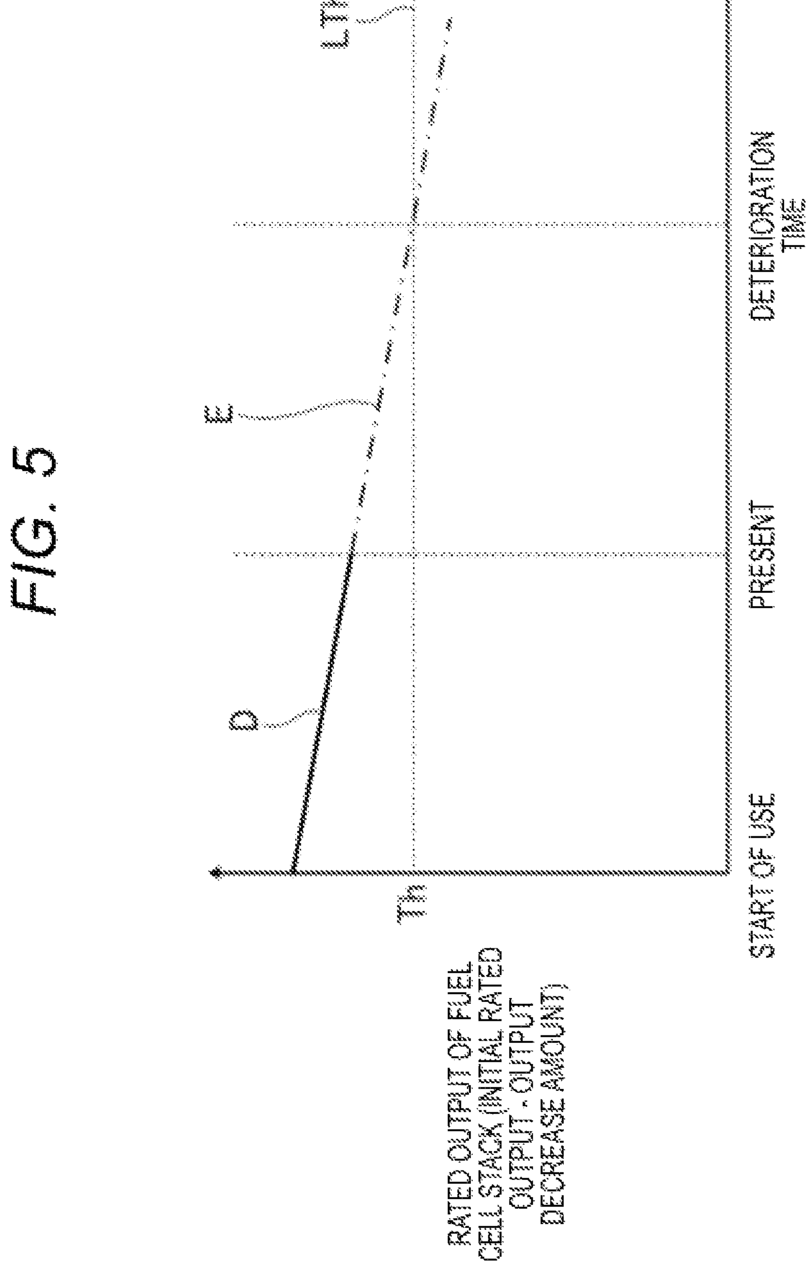
FIG. 5 is a diagram showing an example of a deterioration prediction line of a rated output of a fuel cell stack 12 according to the first embodiment.

The control unit 230 predicts, as the deterioration time, a time at which the rated output of the fuel cell stack 12 is equal to or smaller than a threshold value based on the changes in the output decrease amount from the start of use of the vehicle 100 to the present. For example, as shown in FIG. 5, when the rated output from the start of use of the vehicle 100 to the present changes as indicated by a solid line D, the control unit 230 obtains a deterioration prediction line E shown by a dashed-dotted line. The deterioration prediction line E is, for example, a regression line based on a rated output from the start of use of the vehicle 100 to the present, and can be obtained using a least squares method or the like. A method for deriving the deterioration prediction line E is not limited to the least squares method, and any method may be used. Specifically, for example, the deterioration prediction line E may be derived by a power curve or the like based on an output decrease amount from the start of use of the vehicle 100 to the present.

Based on the obtained deterioration prediction line E, the control unit 230 predicts, as the deterioration time, a time at which the rated output of the fuel cell stack 12 is equal to or smaller than a predetermined threshold value Th. More specifically, as shown in FIG. 5, the control unit 230 predicts a time corresponding to an intersection of a straight line LTh representing the threshold value Th and the deterioration prediction line E as the deterioration time.

The control unit 230 executes processing of outputting information indicating the predicted deterioration time through the output device 300. For example, the control unit 230 executes processing of notifying the user of the vehicle 100 of the deterioration time using the notification device in the output device 300 as processing of outputting information indicating the deterioration time. Accordingly, it is possible to prompt the user to take an appropriate measure in consideration of the deterioration time of the vehicle 100.

More specifically, for example, the control unit 230 causes a display device in the output device 300 as the notification device to display a message "It is expected that replacement of the fuel cell stack 12 is necessary in the remaining Xa years". Accordingly, the user can grasp an approximate deterioration time, and can reserve maintenance of the vehicle 100 (for example, replacement of the fuel cell stack 12) in consideration of the deterioration time. At this time, the control unit 230 may also notify the user of a current rated output of the fuel cell stack 12 by displaying, for example, a message "The current rated output of the fuel cell stack is Xb W and is decreased by Xc % from the initial rated output" on a display device as the notification device in the output device 300.

The control unit 230 may execute processing of notifying an administrator (for example, a dealer or a manufacturer of the vehicle 100) who can perform maintenance of the vehicle 100 by associating identification information of the vehicle 100 with the deterioration time, as the processing of outputting the information indicating the deterioration time. Accordingly, it is possible to prompt the administrator to take an appropriate measure in consideration of the deterioration time of the vehicle 100. A computer of the administrator (for example, a terminal device installed in a store of the administrator, or a server device managed by the administrator) as a notification destination is set in advance for the control device 200, for example.

More specifically, for example, the control unit 230 transmits information indicating a frame number of the vehicle 100 and a deterioration time of the vehicle 100 identified by the frame number to the computer of the administrator through a communication device in the output device 300, thereby displaying the information on the computer of the administrator. Accordingly, the administrator can grasp an approximate deterioration time at which maintenance of the vehicle 100 is required, and for example, when the deterioration time approaches, the administrator notifying the user of the vehicle 100 that the maintenance is required, thereby prompting the user to perform the maintenance. At this time, the control unit 230 may also transmit information indicating the current rated output of the fuel cell stack 12 to the computer of the administrator so that the current rated output of the fuel cell stack 12 is also displayed on the computer of the administrator.

<Processing Executed by Control Device According to First Embodiment>

Next, an example of processing executed by the control device 200 according to the first embodiment will be described with reference to FIG. 6. For example, when the vehicle 100 is started, the control device 200 executes the processing shown in FIG. 6.

Figure 6:
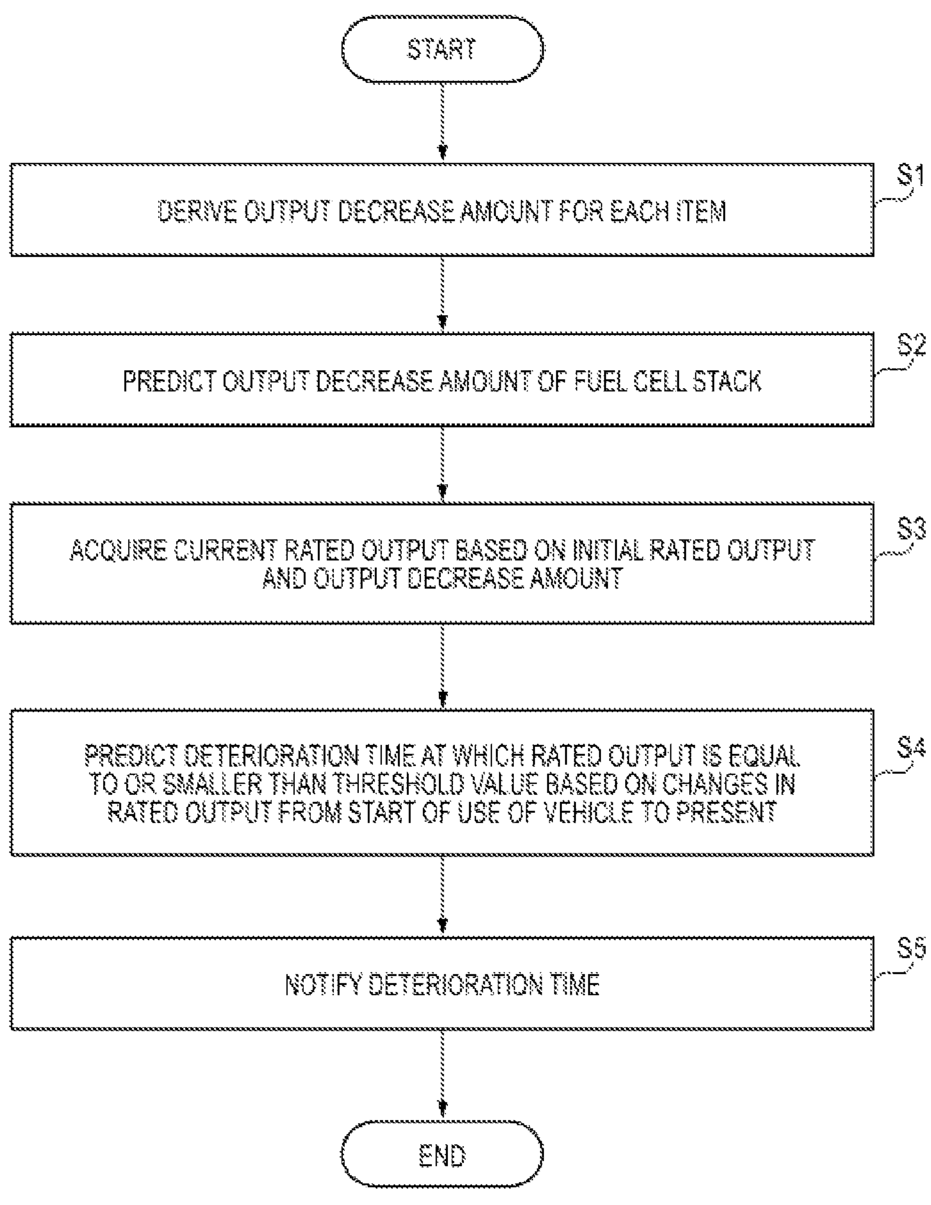
FIG. 6 is a flow chart showing an example of processing executed by the control device 200 according to the first embodiment.

As shown in FIG. 6, the control device 200 derives an output decrease amount for each item of the fuel cell stack 12 based on acquired use history information and output decrease characteristic information (step S1). Next, the control device 200 predicts an output decrease amount of the fuel cell stack 12 based on the derived output decrease amount for each item (step S2), and acquires a current rated output based on an initial rated output and the predicted output decrease amount of the fuel cell stack 12 (step S3).

Next, the control device 200 predicts a deterioration time at which the rated output of the fuel cell stack 12 is equal to or smaller than the threshold value Th based on changes in the output decrease amount from start of use of the vehicle 100 to the present (step S4). The control device 200 notifies a user of the predicted deterioration time by the output device 300 (step S5). In the processing of step S5, the control device 200 may notify the administrator, instead of or in addition to the user, of the deterioration time.

Thus, according to the first embodiment, it is possible to predict the deterioration time at which the rated output of the fuel cell stack 12 is equal to or smaller than the threshold value Th and notify the user or the administrator of the vehicle 100 of the deterioration time. Accordingly, it is possible to prompt the user or the administrator of the vehicle 100 to take an appropriate measure in consideration of deterioration of the fuel cell stack 12, and to support the measure.

The control device 200 may make a notification of the deterioration time only when the deterioration time is before a predetermined time (for example, 10 years from the start of use of the vehicle 100). In this way, notification of the deterioration time can be provided only when deterioration of the fuel cell stack 12 progresses earlier than an assumption of the user or the administrator, and excessive notification can be avoided which may cause the user or the administrator to be bothersome.

Second Embodiment

Next, a second embodiment of the present invention will be described with reference to FIGS. 7 to 10. In the following, the same components as those in the first embodiment are denoted by the same reference signs, and description thereof will be omitted or simplified.

<Control Device>

Figure 7:
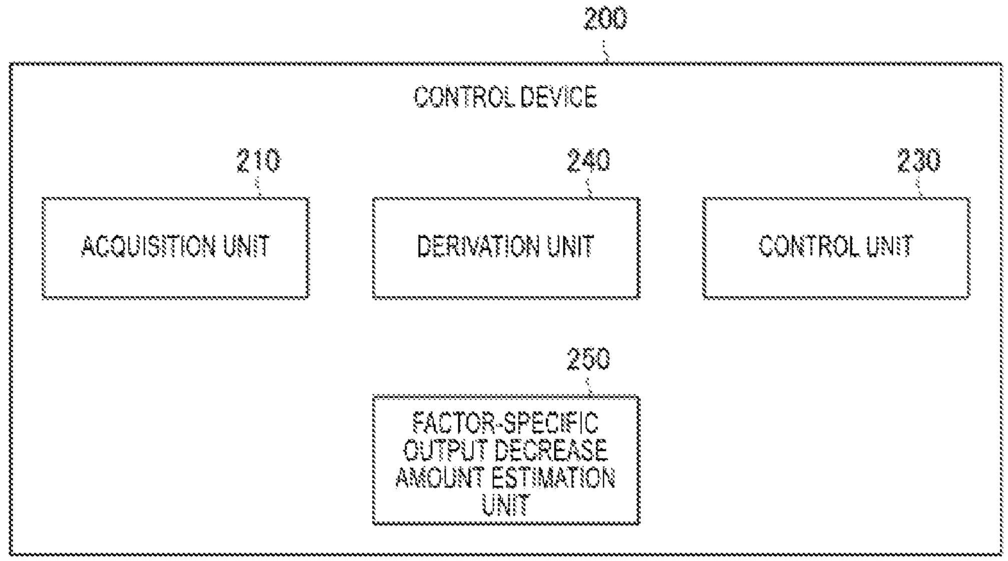
FIG. 7 is a block diagram showing an example of a functional configuration of the control device 200 in the vehicle 100 according to a second embodiment.

As shown in FIG. 7, the control device 200 according to the second embodiment includes a derivation unit 240 and a factor-specific output decrease amount estimation unit 250 instead of the prediction unit 220 according to the first embodiment. The derivation unit 240 and the factor-specific output decrease amount estimation unit 250 are implemented by, for example, a processor executing a program stored in the storage device of the control device 200.

The derivation unit 240 derives the output decrease amount for each item based on the use history information acquired by the acquisition unit 210 and the output decrease characteristic information (described above) indicating the output decrease characteristic of the fuel cell stack 12 for each item. For example, similarly to the prediction unit 220 described above, the derivation unit 240 derives, as the output decrease amount for each item, an output decrease amount for the number of times of starts of the vehicle 100, an output decrease amount for the power generation time of the fuel cell stack 12, and an output decrease amount for the number of times of voltage fluctuations.

The factor-specific output decrease amount estimation unit 250 estimates an output decrease amount for each of output decrease factors based on the output decrease amount for each item derived by the derivation unit 240 and the output decrease factor information indicating the output decrease factor of the fuel cell stack 12 for each item. Here, the output decrease factor information is stored in advance in the storage device of the control device 200, for example. The output decrease factor information may be stored in a storage device external to the control device 200 configured for reference by the control device 200.

An item in the output decrease factor information corresponds to an item in the use history information acquired by the acquisition unit 210. For example, when the use history information acquired by the acquisition unit 210 is the number of times of starts of the vehicle 100, the power generation time of the fuel cell stack 12, the number of times of voltage fluctuations in the fuel cell stack 12, the travel time of the vehicle 100, and the stop time of the vehicle 100, as shown in (a) and (b) of FIG. 8, items in output decrease factor information T are also the number of times of starts, the power generation time, the number of times of voltage fluctuations, the travel time, and the stop time. The output decrease factor information T shown in (a) and (b) of FIG. 8 indicates that an output decrease factor for the number of times of starts and the travel time is a factor $\alpha$, an output decrease factor for the power generation time and the stop time is a factor $\beta$, and an output decrease factor for the number of times of voltage fluctuations is a factor $\gamma$. For example, the factor $\alpha$ can include, but is not limited to, deterioration of a platinum component in the catalyst, the factor $\beta$ can include, but is not limited to, deterioration of a carbon component in the catalyst, and the factor $\gamma$ can include, but is not limited to, an increase in an internal resistance of the fuel cell stack 12.

Figure 8:
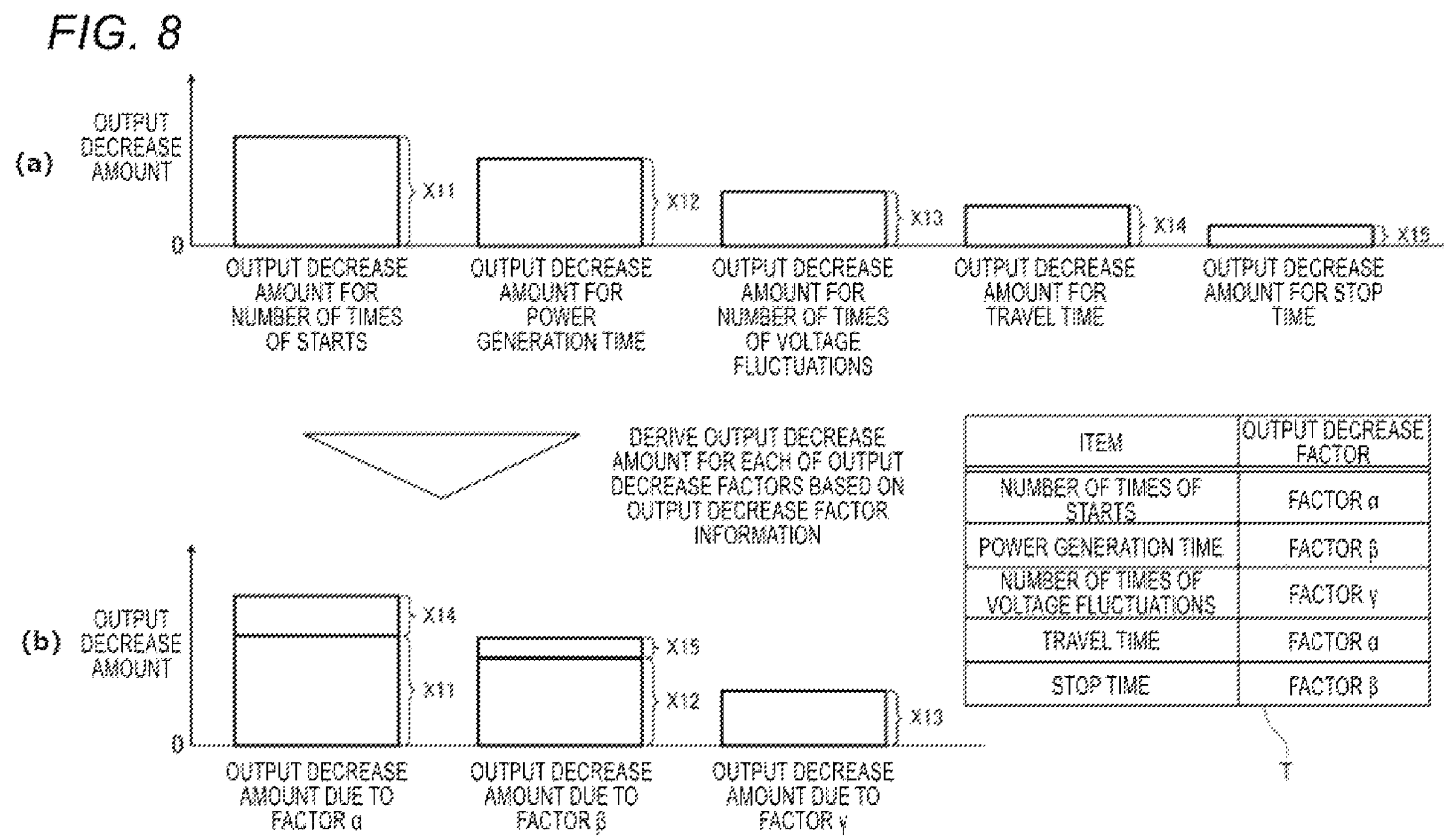
FIG. 8 is a diagram showing an example of output decrease factor information and an example of deriving an output decrease amount by using the output decrease factor information according to the second embodiment.

Based on the use history information acquired by the acquisition unit 210 and the output decrease characteristic information for each item (see (a) of FIG. 4), the derivation unit 240 derives the output decrease amount of the fuel cell stack 12 for each item, that is, an output decrease amount X11 for the number of times of starts, an output decrease amount X12 for the power generation time, an output decrease amount X13 for the number of times of voltage fluctuations, an output decrease amount X14 for the travel time, and an output decrease amount X15 for the stop time, for example, as shown in (a) of FIG. 8.

In this case, the factor-specific output decrease amount estimation unit 250 estimates the output decrease amount for each of the output decrease factors based on the output decrease amounts X11, X12, X13, X14, and X15 for each item derived by the derivation unit 240 and the output decrease factor information T, for example, as shown in (b) of FIG. 8.

That is, the factor-specific output decrease amount estimation unit 250 derives a total value X11+X14 of the output decrease amount X11 for the number of times of starts and the output decrease amount X14 for the travel time as an output decrease amount due to the factor α. The factor-specific output decrease amount estimation unit 250 derives a total value X12+X15 of the output decrease amount X12 for the power generation time and the output decrease amount X15 for the stop time as an output decrease amount due to the factor β. The factor-specific output decrease amount estimation unit 250 derives the output decrease amount X13 for the number of times of voltage fluctuations as an output decrease amount due to the factor γ.

The control unit 230 executes predetermined control based on the output decrease amount for each of the output decrease factors estimated by the factor-specific output decrease amount estimation unit 250.

For example, each time the vehicle 100 is started, the control device 200 acquires the use history information by the acquisition unit 210, derives the output decrease amount for each item based on the use history information by the derivation unit 240, and derives the output decrease amount for each of the output decrease factors by the factor-specific output decrease amount estimation unit 250. The control device 200 stores the derived output decrease amount for each of the output decrease factors and a time at which the output decrease amount is derived (for example, a time specified by an elapsed time from start of use of the vehicle 100) in association with each other in the storage device or the like of the control device 200. Accordingly, the control unit 230 can grasp changes in the output decrease amount for each of the output decrease factors from the start of use of the vehicle 100 to the present by referring to the information stored in the storage device.

The control unit 230 predicts the deterioration time at which the output decrease amount of any one of the output decrease factors is equal to or larger than a threshold value based on the changes in the output decrease amount for each of the output decrease factors from the start of use of the vehicle 100 to the present.

Figure 9:
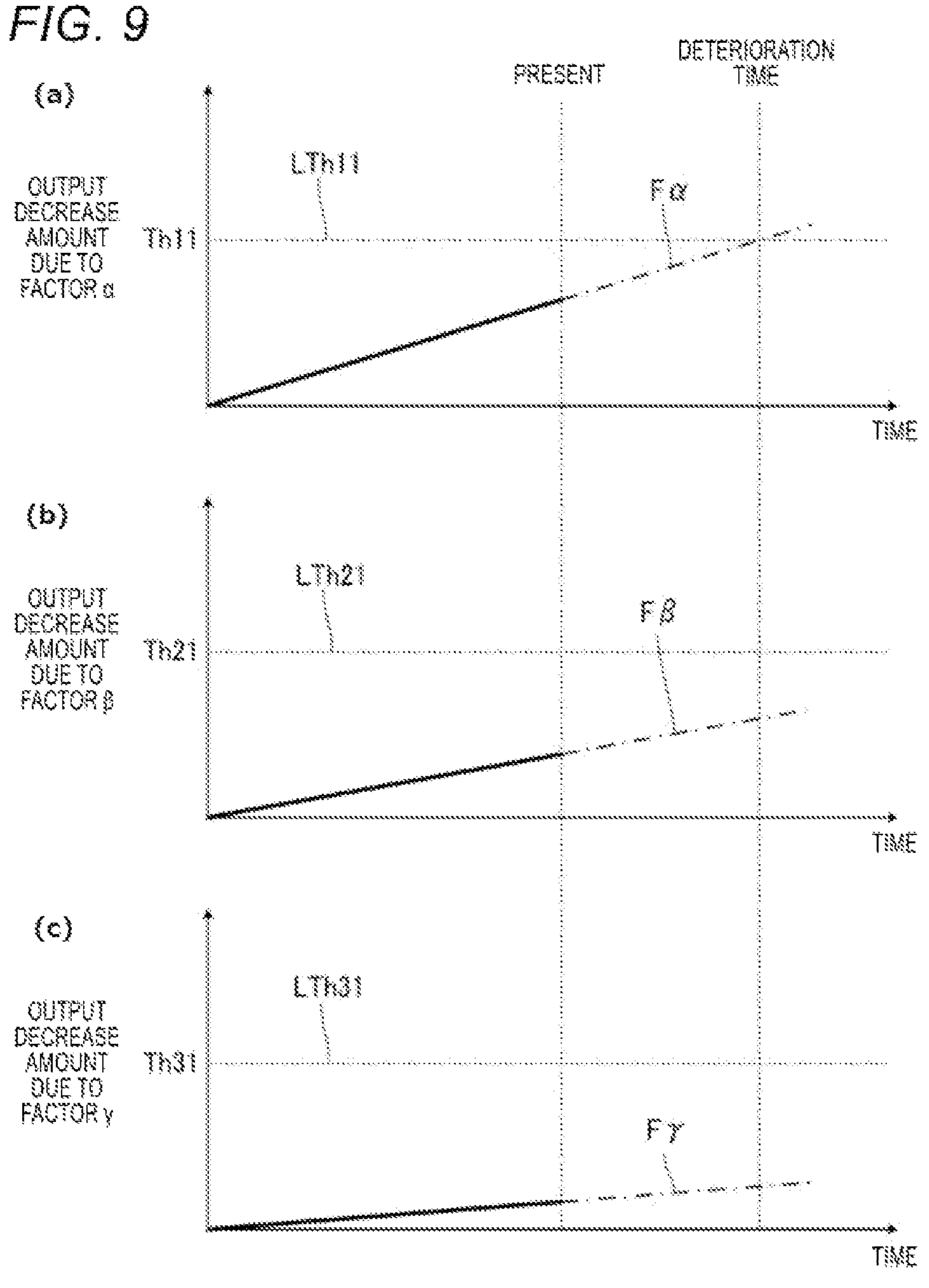
FIG. 9 is a diagram showing a method for predicting a deterioration time for each of output decrease factors according to the second embodiment.

For example, as shown in (a) of FIG. 9, the control unit 230 first obtains a deterioration prediction line Fα based on changes in the output decrease amount for the factor α from the start of use of the vehicle 100 to the present. The deterioration prediction line Fα is, for example, a regression line based on the output decrease amount for the factor α from the start of use of the vehicle 100 to the present, and can be obtained using a least squares method or the like. A method for deriving the deterioration prediction line Fα is not limited to the least squares method, and any method may be used. Specifically, for example, the deterioration prediction line Fα may be derived by a power curve or the like based on an output decrease amount for the factor α from the start of use of the vehicle 100 to the present. The control unit 230 derives a time (hereinafter, also referred to as a "first time") corresponding to an intersection between a straight line LTh11 representing a predetermined threshold value Th11 as a threshold value corresponding to the output decrease amount for the factor α and the obtained deterioration prediction line Fα.

Similarly, as shown in (b) of FIG. 9, the control unit 230 obtains a deterioration prediction line Fβ based on changes in the output decrease amount for the factor β from the start of use of the vehicle 100 to the present. The deterioration prediction line Fβ is, for example, a regression line based on the output decrease amount for the factor β from the start of use of the vehicle 100 to the present, and can be obtained using a least squares method or the like. A method for deriving the deterioration prediction line Fβ is not limited to the least squares method, and any method may be used. Specifically, for example, the deterioration prediction line Fβ may be derived by a power curve or the like based on an output decrease amount for the factor β from the start of use of the vehicle 100 to the present. The control unit 230 derives a time (hereinafter, also referred to as a "second time") corresponding to an intersection between a straight line LTh21 representing a predetermined threshold value Th21 as a threshold value corresponding to the output decrease amount for the factor β and the obtained deterioration prediction line Fβ.

As shown in (c) of FIG. 9, the control unit 230 obtains a deterioration prediction line Fγ based on changes in the output decrease amount for the factor γ from the start of use of the vehicle 100 to the present. The deterioration prediction line Fγ is, for example, a regression line based on the output decrease amount for the factor γ from the start of use of the vehicle 100 to the present, and can be obtained using a least squares method or the like. A method for deriving the deterioration prediction line Fγ is not limited to the least squares method, and any method may be used. Specifically, for example, the deterioration prediction line Fγ may be derived by a power curve or the like based on an output decrease amount for the factor γ from the start of use of the vehicle 100 to the present. The control unit 230 derives a time (hereinafter, also referred to as a "third time") corresponding to an intersection between a straight line LTh31 representing a predetermined threshold value Th31 as a threshold value corresponding to the output decrease amount for the factor γ and the obtained deterioration prediction line Fγ.

Thus, in the second embodiment, the control unit 230 predicts a time when the output decrease amount for each of the output decrease factors reaches the threshold value corresponding to the output decrease amount. The control unit 230 executes processing of predicting, as the deterioration time, an earliest time in time series among the predicted times, and outputting information indicating the predicted deterioration time via the output device 300. In the examples shown in (a) to (c) of FIG. 9, since the first time is the earliest time in the time series among the first time, the second time, and the third time described above, the first time is predicted as the deterioration time.

<Processing Executed by Control Device According to Second Embodiment>

Next, an example of processing executed by the control device 200 according to the second embodiment will be described. For example, when the vehicle 100 is started, the control device 200 executes the processing shown in FIG. 10.

Figure 10:
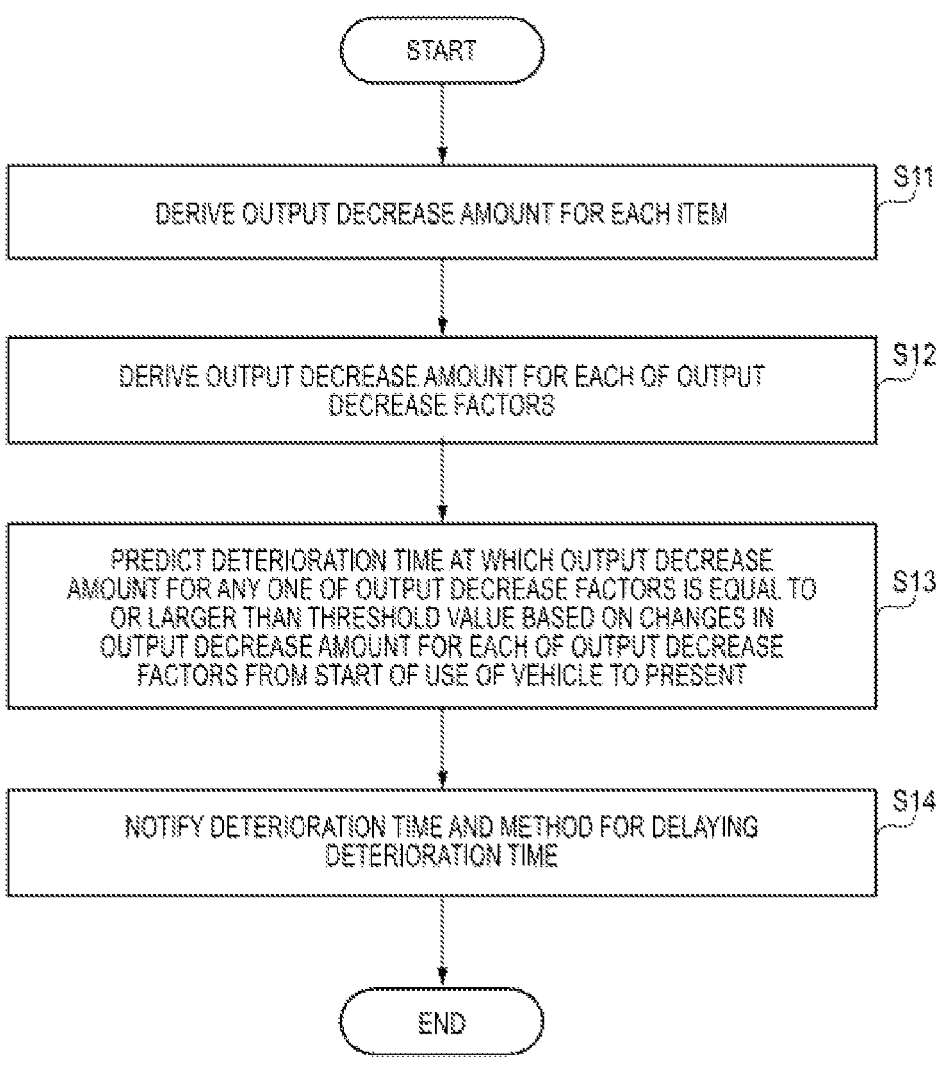
FIG. 10 is a flow chart showing an example of processing executed by the control device 200 according to the second embodiment.

As shown in FIG. 10, the control device 200 derives an output decrease amount for each item of the fuel cell stack 12 based on acquired use history information and output decrease characteristic information (step S11). Next, the control device 200 derives an output decrease amount for each of the output decrease factors based on the derived output decrease amount for each item and the output decrease factor information T (step S12).

Next, the control device 200 predicts a deterioration time at which the output decrease amount due to any one of the output decrease factors is equal to or larger than a threshold value based on changes in the output decrease amount for each of the output decrease factors from start of use of the vehicle 100 to the present (step S13). The control device 200 notifies a user of the vehicle 100 of the predicted deterioration time and a method for delaying the deterioration time (step S14).

Here, the method for delaying the deterioration time will be specifically described. For example, it is assumed that a time at which the output decrease amount for the factor α is equal to or larger than the threshold value Th11 (the first time above) is predicted as the deterioration time. As shown in (a) and (b) of FIG. 8, the output decrease amount for the factor α corresponds to the output decrease amount for the number of times of starts and the travel time of the vehicle 100. Therefore, if the number of times of starts and the travel time of the vehicle 100 can be temporarily reduced and an increase in the output decrease amount for the number of times of starts and the travel time of the vehicle 100 can be reduced, it is considered that the deterioration time can be delayed by that amount. Therefore, when the control device 200 predicts the first time as the deterioration time, the control device 200 notifies the user, for example, to reduce the number of times of starts or the travel time of the vehicle 100 as much as possible as the method for delaying the deterioration time.

On the other hand, it is assumed that the time at which the output decrease amount for the factor γ is equal to or larger than the threshold value Th31 (the third time above) is predicted as the deterioration time. As shown in (a) and (b) of FIG. 8, the output decrease amount for the factor γ corresponds to the output decrease amount for the number of times of voltage fluctuations in the fuel cell stack 12. Therefore, if the number of times of voltage fluctuations in the fuel cell stack 12 can be temporarily reduced and an increase in the output decrease amount for the number of times of voltage fluctuations can be reduced, it is considered that the deterioration time can be delayed by that amount. Therefore, when the control device 200 predicts the third time as the deterioration time, the control device 200 notifies the user, for example, to set a drive mode of the vehicle 100 to an eco mode as the method for delaying the deterioration time. Here, the eco mode is a drive mode in which an output response of the travel motor Mt in response to an accelerator operation is made slower than in other drive modes (for example, normal mode).

In processing of step S14, the control device 200 may notify the administrator, instead of or in addition to the user, of the deterioration time or the like.

Thus, according to the second embodiment, it is possible to predict the deterioration time at which the output decrease amount for any one of the output decrease factors is equal to or larger than the threshold value, and notify the user or the administrator of the vehicle 100 of the deterioration time. Accordingly, it is possible to prompt the user or the administrator of the vehicle 100 to take an appropriate measure in consideration of deterioration of the fuel cell stack 12, and to support the measure.

The control device 200 may output information indicating the output decrease amount for each of the output decrease factors via the output device 300 at a predetermined timing such as a timing at which a predetermined operation is performed in the vehicle 100. In this way, for example, by performing a predetermined operation during maintenance of the vehicle 100, the administrator can know the output decrease amount for each of the output decrease factors in the vehicle 100, and can grasp how the user uses the vehicle 100 or perform an appropriate measure according to a state of the fuel cell stack 12 at that time.

The control device 200 may output information indicating a current rated output of the fuel cell stack 12 via the output device 300 at a predetermined timing such as a timing at which a predetermined operation is performed in the vehicle 100. In this way, for example, the user or the administrator can appropriately know the current rated output of the fuel cell stack 12 by performing a predetermined operation.

The first embodiment and the second embodiment described above may be combined, and for example, the control device 200 may predict a timing at which the rated output of the fuel cell stack 12 is equal to or smaller than the threshold value Th and a timing at which the output decrease amount due to any one of the output decrease factors is equal to or larger than a threshold value, and may predict an earliest time in time series among the predicted times as the deterioration time.

As described above, according to each embodiment of the present invention, the deterioration time at which deterioration of the fuel cell stack 12 is assumed to have progressed is predicted, and the deterioration time is notified to the user or the administrator of the vehicle 100. Therefore, it is possible to prompt the user or the administrator of the vehicle 100 to take an appropriate measure in consideration of the deterioration of the fuel cell stack 12, and to support the measure. Accordingly, it is possible to reduce deterioration of the fuel cell stack 12 and improve energy consumption efficiency of the fuel cell system 10 including the fuel cell stack 12 as a power source, and to contribute to efficiency of energy.

Although the embodiments of the present invention are described above with reference to the accompanying drawings, it goes without saying that the present invention is not limited to such embodiments. It will be apparent to those skilled in the art that various changes and modifications may be conceived within the scope of the claims, and it is also understood that the various changes and modifications belong to the technical scope of the present invention. The respective constituent elements in the above embodiments may be combined as desired without departing from the gist of the invention.

For example, when the control device 200 and a terminal device (for example, a smartphone) of the user can communicate with each other, the control device 200 may notify the user of the deterioration time or a method for delaying the deterioration time via the terminal device of the user. For example, when the deterioration time can be delayed by changing control of the control device 200 related to the fuel cell stack 12, the control device 200 may notify the user that the deterioration time can be delayed by the control change in accordance with the notification of the deterioration time or the like, and receive an operation to select whether to execute the control change from the user. The control device 200 may change control over the fuel cell stack 12 on condition that an operation to execute the control change is received from the user. Accordingly, it is possible to avoid executing the control change of the control device 200 related to the fuel cell stack 12 against an intention of the user. For example, when the control device 200 and a terminal device (for example, a smartphone) of the user can communicate with each other, the control device 200 may make the notification described above or the like via the terminal device of the user. Further, for example, the control device 200 may download a program, data, or the like necessary for executing the control change from a server device capable of communicating with the control device 200 based on reception of an operation to execute the control change from the user.

For example, in the above embodiment, an example in which the information processing device according to the present invention is implemented by the control device 200 in the vehicle 100 is described, but the present invention is not limited thereto. For example, some or all of the functional units which are the acquisition unit 210, the prediction unit 220, the control unit 230, the derivation unit 240, and the factor-specific output decrease amount estimation unit 250 of the control device 200 may be implemented by a server device capable of communicating with the control device 200. That is, the information processing device according to the present invention may be implemented by a server device capable of communicating with the control device 200 in the vehicle 100. The server device may be a virtual server (cloud server) implemented in a cloud computing service, or may be a physical server implemented as a single device.

Further, the information processing device according to the present invention is not limited to be in the vehicle 100, and can be applied to any fuel cell system including a fuel cell. Here, the fuel cell system can be, for example, a stationary residential power supply system including a fuel cell such as the fuel cell stack 12, which is referred to as a "residential fuel cell cogeneration system". When the present invention is applied to such a fuel cell system, the acquisition unit 210 in the control device 200 as an example of the information processing device may acquire use history information indicating a use history of the fuel cell system. The prediction unit 220 may predict an output decrease amount of the fuel cell based on the use history information acquired by the acquisition unit 210 and output decrease characteristic information indicating an output decrease characteristic of the fuel cell in the fuel cell system according to the use history of the fuel cell system. The control unit 230 may execute processing of predicting a deterioration time at which a rated output of the fuel cell is equal to or smaller than a threshold value based on changes in an output decrease amount from start of use of the vehicle 100 to the present, and outputting information indicating the deterioration time.

When the present invention is applied to a fuel cell system such as a stationary residential power supply system, the derivation unit 240 in the control device 200 as an example of the information processing device may derive the output decrease amount for each item based on the use history information acquired by the acquisition unit 210 and the output decrease characteristic information indicating the output decrease characteristic of the fuel cell for each item. The factor-specific output decrease amount estimation unit 250 may estimate the output decrease amount for each of the output decrease factors based on the output decrease amount for each item derived by the derivation unit 240 and the output decrease factor information indicating the output decrease factor of the fuel cell for each item. The control unit 230 may execute processing of predicting a deterioration time at which the output decrease amount for any one of the output decrease factors is equal to or larger than a threshold value based on changes in the output decrease amount for each of the output decrease factors from start of use of the fuel cell system to the present, and outputting information indicating the deterioration time.

In this way, even when the information processing device according to the present invention is applied to any fuel cell system including a fuel cell, a user of the fuel cell system or an administrator who can perform maintenance of the fuel cell system can grasp the deterioration time in the fuel cell system, and can prompt the user or the administrator to take an appropriate measure in consideration of the deterioration time.

In the present specification, at least the following matters are described. Components corresponding to those according to the above embodiments are shown in parentheses. However, the present invention is not limited thereto.

(1) An information processing device (control device 200) for predicting an output decrease amount of a fuel cell (fuel cell stack 12) in a vehicle (vehicle 100) including the fuel cell and a drive source (travel motor Mt) driven by electric power of the fuel cell, the information processing device including:

- an acquisition unit (acquisition unit 210) configured to acquire use history information indicating a use history of the vehicle;
- a prediction unit (prediction unit 220) configured to predict the output decrease amount based on use history information acquired by the acquisition unit and output decrease characteristic information indicating an output decrease characteristic of the fuel cell according to the use history; and
- a control unit (control unit 230) configured to execute predetermined control based on the output decrease amount predicted by the prediction unit, in which
- the control unit executes processing of predicting a deterioration time at which a rated output of the fuel cell is equal to or smaller than a threshold value (threshold value Th) based on changes in the output decrease amount from start of use of the vehicle to present, and outputting information indicating the deterioration time.

According to (1), it is possible to predict the deterioration time at which deterioration of the fuel cell is assumed to have progressed, and to output the information indicating the deterioration time. This makes it possible for the user of the vehicle or the administrator who can perform maintenance of the vehicle to grasp the deterioration time of the vehicle, and to prompt the user or the administrator to take an appropriate measure in consideration of the deterioration time.

(2) An information processing device for predicting an output decrease amount of a fuel cell in a vehicle including the fuel cell and a drive source driven by electric power of the fuel cell, the information processing device including:

- an acquisition unit configured to acquire use history information indicating a use history of the vehicle for a plurality of items related to an output decrease of the fuel cell;
- a derivation unit (derivation unit 240) configured to derive the output decrease amount for each of the items based on use history information acquired by the acquisition unit and output decrease characteristic information indicating an output decrease characteristic of the fuel cell for each of the items;
- a factor-specific output decrease amount estimation unit (factor-specific output decrease amount estimation unit 250) configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined control based on the output decrease amount for each of the output decrease factors estimated by the factor-specific output decrease amount estimation unit, in which the control unit executes processing of predicting a deterioration time at which an output decrease amount for any one of the output decrease factors is equal to or larger than a threshold value (threshold value Th11, threshold value Th21, threshold value Th31) based on changes in the output decrease amount for each of the output decrease factors from start of use of the vehicle to present, and outputting information indicating the deterioration time.

According to (2), it is possible to predict the deterioration time at which deterioration of the fuel cell is assumed to have progressed, and to output the information indicating the deterioration time. This makes it possible for the user of the vehicle or the administrator who can perform maintenance of the vehicle to grasp the deterioration time of the vehicle, and to prompt the user or the administrator to take an appropriate measure in consideration of the deterioration time.

(3) The information processing device according to (1) or (2), in which the control unit executes processing of notifying a user of the vehicle of the deterioration time as processing of outputting information indicating the deterioration time.

According to (3), since it is possible to notify the user of the vehicle of the deterioration time at which the deterioration of the fuel cell is assumed to have progressed, it is possible to prompt the user to take an appropriate measure in consideration of the deterioration time.

(4) The information processing device according to (1) or (2), in which the control unit executes processing of notifying an administrator who performs maintenance of the vehicle by associating identification information of the vehicle with the deterioration time, as processing of outputting information indicating the deterioration time.

According to (4), since it is possible to notify the administrator who can perform the maintenance of the vehicle of the deterioration time at which deterioration of the fuel cell is assumed to have progressed, it is possible to prompt the administrator to take an appropriate measure in consideration of the deterioration time.

(5) The information processing device according to (2), in which the control unit executes processing of notifying a user of the vehicle of the deterioration time and a method for delaying the deterioration time according to the output decrease factor in which the output decrease amount is equal to or larger than the threshold value, as processing of outputting information indicating the deterioration time.

According to (5), since it is possible to notify the user of the vehicle of the deterioration time at which deterioration of the fuel cell is assumed to have progressed and the method for delaying the deterioration time, it is possible to prompt the user to take an appropriate measure in consideration of the deterioration time and perform the method for delaying the deterioration time.

(6) The information processing device according to (2), in which the control unit further executes processing of outputting information indicating an output decrease amount for each of the output decrease factors at a predetermined timing.

According to (6), since the information indicating the output decrease amount for each of the output decrease factors can be output, for example, an administrator who can perform maintenance of the vehicle can grasp how to use the vehicle or take an appropriate measure according to a state of the fuel cell.

(7) The information processing device according to any one of (1) to (6), in which the control unit further executes processing of outputting information indicating a current rated output of the fuel cell at a predetermined timing.

According to (7), since the information indicating the current rated output of the fuel cell can be output, for example, it is possible to notify a user or an administrator of the current rated output of the fuel cell.

(8) An information processing device for predicting an output decrease amount of a fuel cell in a fuel cell system including the fuel cell, the information processing device including:

an acquisition unit configured to acquire use history information indicating a use history of the fuel cell system;

a prediction unit configured to predict the output decrease amount based on use history information acquired by the acquisition unit and output decrease characteristic information indicating an output decrease characteristic of the fuel cell according to the use history; and a control unit configured to execute predetermined processing based on the output decrease amount predicted by the prediction unit, in which the control unit executes processing of predicting a deterioration time at which a rated output of the fuel cell is equal to or smaller than a threshold value based on changes in the output decrease amount from start of use of the fuel cell system to present, and outputting information indicating the deterioration time.

According to (8), it is possible to predict a deterioration time at which deterioration of the fuel cell is assumed to have progressed, and to output information indicating the deterioration time. This makes it possible for the user of the fuel cell system or the administrator who can perform maintenance of the fuel cell system to grasp the deterioration time in the fuel cell system, and to prompt the user or the administrator to take an appropriate measure in consideration of the deterioration time.

(9) An information processing device for predicting an output decrease amount of a fuel cell in a fuel cell system including the fuel cell, the information processing device including:

an acquisition unit configured to acquire use history information indicating a use history of the fuel cell system for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined processing based on the output decrease amount for each of the output decrease factors estimated by the factor-specific output decrease amount estimation unit, in which the control unit executes processing of predicting a deterioration time at which an output decrease amount for any one of the output decrease factors is equal to or larger than a threshold value based on changes in the output decrease amount for each of the output decrease factors from start of use of the fuel cell system to present, and outputting information indicating the deterioration time.

According to (9), it is possible to predict a deterioration time at which deterioration of the fuel cell is assumed to have progressed, and to output information indicating the deterioration time. This makes it possible for the user of the fuel cell system or the administrator who can perform maintenance of the fuel cell system to grasp the deterioration time in the fuel cell system, and to prompt the user or the administrator to take an appropriate measure in consideration of the deterioration time.

What is claimed is:

1. An information processing device for predicting an output decrease amount of a fuel cell in a vehicle including the fuel cell and a drive source driven by electric power of the fuel cell, the information processing device comprising:

an acquisition unit configured to acquire use history information indicating a use history of the vehicle for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined control based on the output decrease amount for each of the output decrease factors estimated by the factor-specific output decrease amount estimation unit, wherein the control unit executes processing of predicting a deterioration time at which an output decrease amount for any one of the output decrease factors is equal to or larger than a threshold value based on changes in the output decrease amount for each of the output decrease factors from start of use of the vehicle to present, and outputting information indicating the deterioration time.

2. The information processing device according to claim 1, wherein the control unit executes processing of notifying a user of the vehicle of the deterioration time as processing of outputting information indicating the deterioration time.

3. The information processing device according to claim 1, wherein the control unit executes processing of notifying an administrator who performs maintenance of the vehicle by associating identification information of the vehicle with the deterioration time, as processing of outputting information indicating the deterioration time.

4. The information processing device according to claim 1, wherein the control unit executes processing of notifying a user of the vehicle of the deterioration time and a method for delaying the deterioration time according to the output decrease factor in which the output decrease amount is equal to or larger than the threshold value, as processing of outputting information indicating the deterioration time.

5. The information processing device according to claim 1, wherein the control unit further executes processing of outputting information indicating an output decrease amount for each of the output decrease factors at a predetermined timing.

6. The information processing device according to claim 1, wherein the control unit further executes processing of outputting information indicating a current rated output of the fuel cell at a predetermined timing.

7. An information processing device for predicting an output decrease amount of a fuel cell in a fuel cell system including the fuel cell, the information processing device comprising:

an acquisition unit configured to acquire use history information indicating a use history of the fuel cell system for a plurality of items related to an output decrease of the fuel cell;

a derivation unit configured to derive the output decrease amount for each of the items based on use history information acquired by the acquisition unit and output decrease characteristic information indicating an output decrease characteristic of the fuel cell for each of the items;

a factor-specific output decrease amount estimation unit configured to estimate the output decrease amount for each of output decrease factors based on the output decrease amount for each of the items derived by the derivation unit and output decrease factor information indicating an output decrease factor of the fuel cell for each of the items; and a control unit configured to execute predetermined processing based on the output decrease amount for each of the output decrease factors estimated by the factor-specific output decrease amount estimation unit, wherein the control unit executes processing of predicting a deterioration time at which an output decrease amount for any one of the output decrease factors is equal to or larger than a threshold value based on changes in the output decrease amount for each of the output decrease factors from start of use of the fuel cell system to present, and outputting information indicating the deterioration time.

* * * * *